Aug. 4, 1925.  
G. D. HUGO  
BRAKING SYSTEM  
Filed April 24, 1923
1,548,319
3 Sheets-Sheet 1
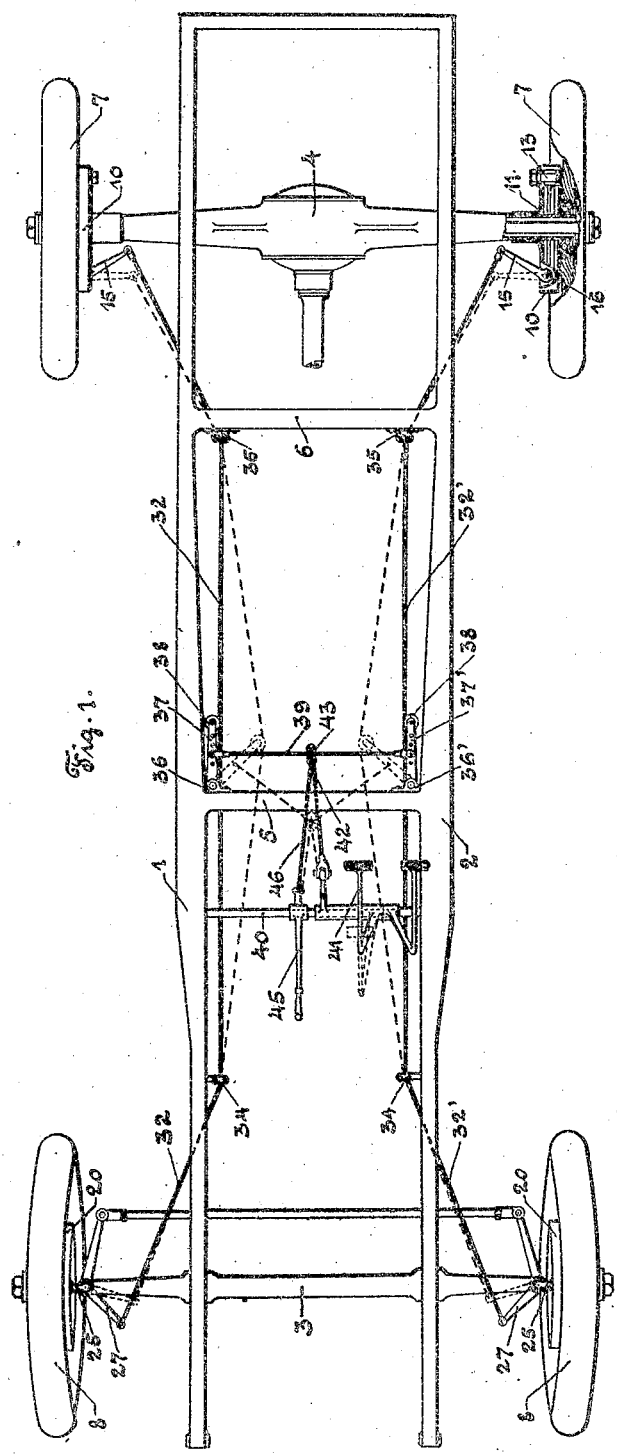
INVENTOR  
George D. Hugo Aug. 4, 1925.

G. D. HUGO 1,548,319

BRAKING SYSTEM

Filed April 24, 1923

INVENTOR
George D. Hugo.

Aug. 4, 1925.
G. D. HUGO
1,548,319
BRAKING SYSTEM
Filed April 24, 1923    3 Sheets-Sheet 3
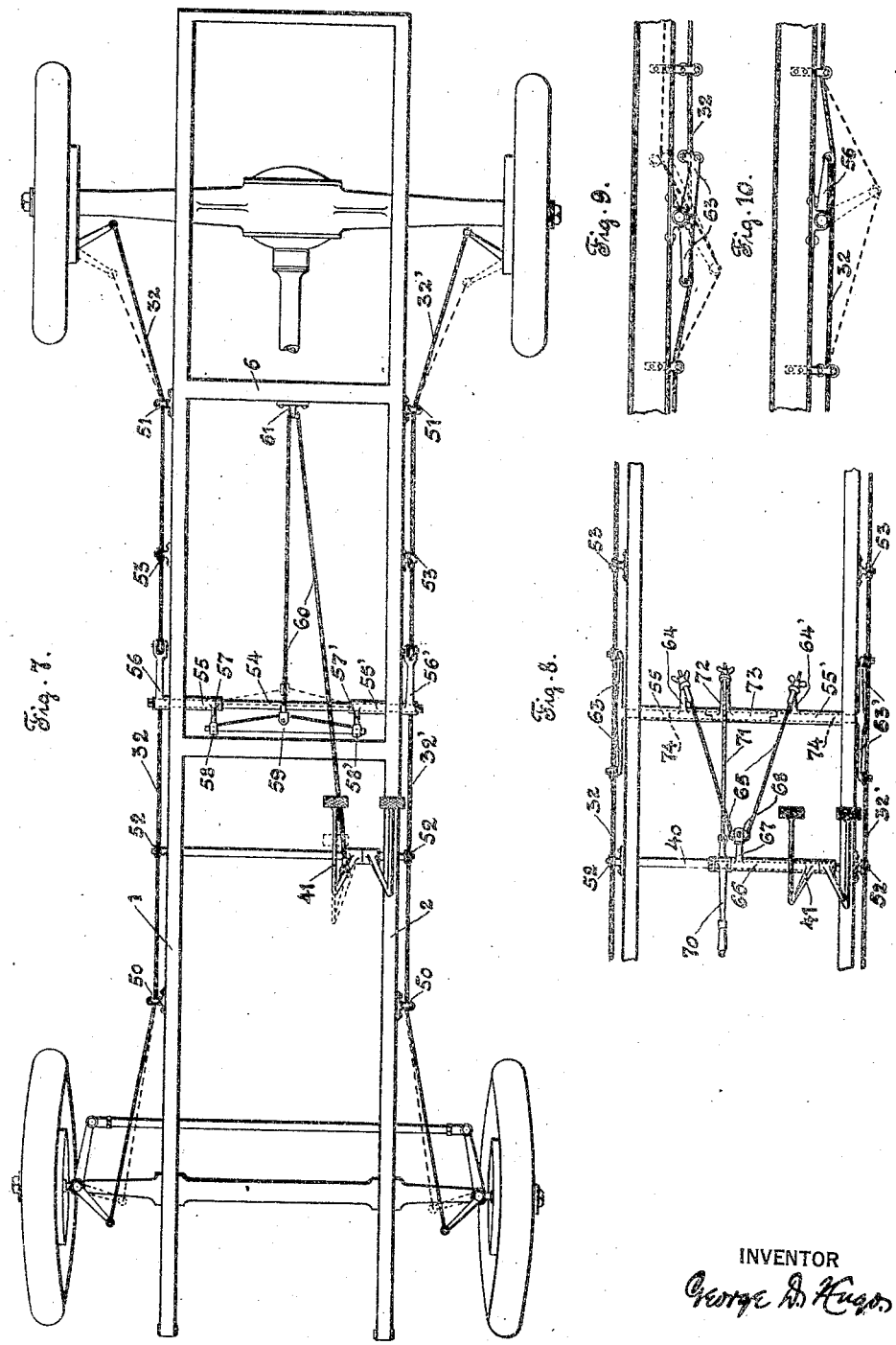
INVENTOR
George D. Hugo Patented Aug. 4, 1925.

1,548,319

UNITED STATES PATENT OFFICE.

GEORGE D. HUGO, OF SEATTLE, WASHINGTON.

BRAKING SYSTEM.

Application filed April 24, 1923. Serial No. 634,306.

*To all whom it may concern:*

Be it known that I, GEORGE D. HUGO, a citizen of the United States, and a resident of the city of Seattle, county of King, State of Washington, have invented certain new and useful Improvements in Braking Systems, of which the following is a specification.

This invention relates to improvements in vehicle brakes, and more particularly to four wheel braking systems of that type of construction adapted for use on automobiles, trucks, trailers and similar types of vehicles.

The practicability of four wheel braking systems for automobiles is no longer a matter of controversy, for, being essentially high speed vehicles, they require powerful and dependable brakes for safe operation. This is especially true in business sections of cities where traffic regulations require high rates of speed and quick stops.

In common practice brakes are applied only on the rear wheels, but since the braking power depends upon the ground adhesion of the road wheels, it can easily be seen that by utilizing the entire weight of the vehicle a greater adhesion between the wheels and the road surface is established and the time for stopping the vehicle is diminished accordingly.

The continued application of the brakes of the vehicle, as in descending long grades, produces heat, which, in order to avoid overheating the braking members, has to be dissipated at the surfaces of the brake drums; with drums applied to the four wheels of a vehicle, where heretofor they have applied to only two, the surface for the dissipation of heat is increased and the destructive action of undue heat is reduced in proportion.

Braking pressure unequally distributed tends to cause skidding, therefor the degree of safety with which brakes may be applied depends to a great extent upon the equalization of the braking forces as applied to the brake drums.

With the above facts in mind, it has been the object of this invention to provide a four wheel braking system, whereby the ground lhesion of the four wheels of the vehicle is utilized to produce the greatest retarding effect, whereby the destructive action of heat is avoided and the braking forces as applied to the wheels are automatically equalized.

In accomplishing these and other objects of the invention I have provided the improved details of construction, the preferred forms of which are illustrated in the accompanying drawings, wherein:

Figure 1 is a plan view of a vehicle chassis equipped with a braking system in accordance with the present invention.

Figure 7 is a plan view of a vehicle chassis equipped with a braking system of an alternative arrangement.

Figure 8 illustrates another alternative arrangement wherein the cable tightening levers are adapted to swing in a vertical plane.

Figures 9 and 10 illustrate other modifications in the construction of the cable tighteners and their mode of operation.

Figure 5:
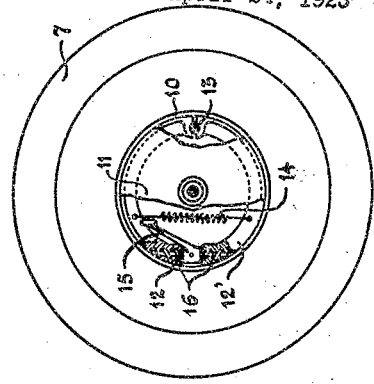
Figure 5 is an inside view of the same, the drum cover being removed and parts being shown in section for better illustration.
Figure 4:
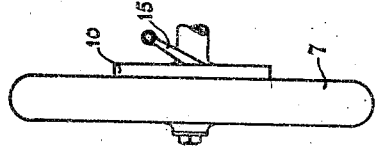
Figure 4 is a front view of a rear wheel of the vehicle, showing the disposition of the brake actuating lever.

Referring more in detail to the drawings: 1 and 2 respectively designate the opposite side members of an automobile frame that may be mounted in the usual, or any suitable manner, upon a front axle 3 and a rear axle 4. The side members 1 and 2 are connected across the central part of the frame by cross members 5 and 6 upon which certain parts of the braking system, as disclosed in Figure 1, are mounted. At the ends of the rear axle are driving wheels 7, and the steering wheels 8 are mounted at the ends of the front axle, all of which wheels are equipped with braking mechanism, which may be of standard or special design.

The present invention does not relate particularly to the braking members such as the brake shoes and their expanding means, but more particularly to a system, whereby the braking mechanism of each wheel may be operated from controls common to all, and by which the braking forces are automatically equalized. For this reason I have illustrated conventional types of layouts with the understanding that the system is not to be limited only to these shown, but can be used equally as well with other types of braking mechanism.

The braking mechanism of the rear wheels comprises brake drums 10 that are fixed to revolve with the wheels and which are equipped with drum covers 11 that are mounted rigidly on the axle housing. Located within the drums are paired brake shoes 12—12' having ends pivotally mounted on supporting pins 13 fixed in the drum covers, so that they may be expanded against the drum to effect a braking action. Normally the shoes are held disengaged from the drums by springs 14, fixed at their ends to the opposite shoes.

The means here illustrated for expanding the shoes comprises the brake levers 15; these are mounted to swing horizontally, and at their inner ends have right and left hand screw shafts 16 fixed therein and threaded into the swinging ends of the shoes, as is shown best in Figure 5, so that, as the levers are moved forwardly, as from position shown in full lines to that in dotted lines in Figure 1, the shoes will be expanded against the drums.

Figure 3:
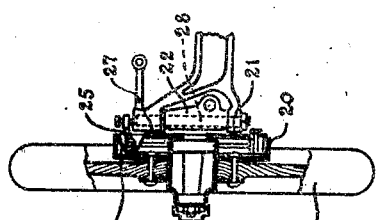
Figure 3 is a front view of the wheel, partly in section, for better illustration of the brake actuating means.
Figure 2:
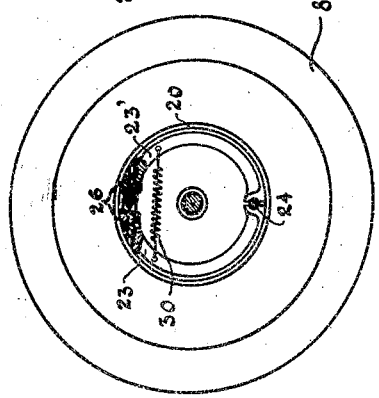
Figure 2 is an inside view of a front wheel of the vehicle with the brake drum cover removed and parts in section for better illustrating the brake shoe actuating means.

A front wheel braking mechanism is best illustrated in Figures 2 and 3, wherein 20 designates the brake drum that is secured to the wheel and revolves therewith, and 21 designates the drum cover that is fixed to the steering knuckle 22. Within the drum are paired shoes 23—23' that have ends pivotally mounted on a supporting pin 24 that is fixed in t' drum cover vertically below the knuckle spindle and which are expanded against the drum by the upward swinging action of a brake lever 25 that is fixed, between the swinging ends of the shoes, to screw shafts 26 that are threaded, by means of right and left hand threads, into the shoes. The levers 25 are actuated by means of cam levers 27 that are rotatable upon the upper ends of the king pins , whereby the knuckles are mounted in the yokes at the ends of the axle. Each lever 27 has a cam surface co-acting with a cam surface on the upper arm of the yoke, whereby a rearward swinging of the lever, as from full line position to dotted line position as shown in Figure 1, will cause a rising movement of the lever 27, which in turn causes an upward swinging of lever 25 whereby the shoes are expanded against the drum. When the braking force is removed the parts are brought back to normal position by springs 30 connected to the opposite shoes as shown in Figure 2.

The preferred means for operating the brakes of the four wheels is illustrated in Figure 1, wherein 32—32' designate flexible cables, extended longitudinally of the frame and connected at their ends respectively to the cam levers 27, whereby the front wheel brakes are actuated, and to the brake levers 15, whereby the rear wheel brakes are controlled. These cables, in this construction, are shown extended between paired guide rollers 34 fixed to the frame side members toward the front end of the frame, and between paired rollers 35 fixed to the cross members 6. They are drawn tight so that any deflection from their normal position will cause the brake levers, with which they connect, to be actuated toward braking position.

Fixed to the inner sides of the frame members 1 and 2, at directly opposite points of the frame are brackets 36—36', and pivotally mounted in these are levers 37—37' that extend rearwardly and are adapted to swing in a horizontal plane. They are provided at their swinging ends with rollers 38 adapted to engage in rolling contact with the cables, when the levers are swung inwardly. A cable 39 is fixed at its ends to the levers 37—37' and is drawn taut between them.

For the purpose of effecting a primary braking action of the rear wheel brakes, as will hereinafter be described, the levers 37—37' are so located that their rollers 38, when actuated, will exert pressure against the cables 32—32' at points substantially closer to the connections of the cables with the levers of the rear wheel brakes than their connections with the levers of the front wheel brakes.

Supported on rod 40, that is fixed transversely within the frame, is a foot pedal 41 and connected therewith is the forward end of a cable 42 which at its rearward end is fixed to a compensating pulley 43 that is connected with and is movable along the cable 39. There is also a hand lever 45 mounted on the cross rod 40 and this is likewise connected with pulley 43 by means of a cable 46. These connections provide, that by moving the foot pedal forwardly or by pulling the hand lever rearwardly, the pulley 43 will draw forwardly on the cable 39 and thereby cause inward swinging of the levers 37—37' which, in turn, draw inwardly on the cable 32—32' and thereby actuate the four brake levers.

It will be noted that by this construction the braking forces on all wheels are automatically equalized, since, pressure applied to the cables 32—32' by the levers 37—37' is equally distributed to the forward and rearward brakes, and the tightening pressure applied to cable 39 through compensating pulley 43 is divided equally to the levers 37—37' by the automatic adjustment of the pulley along the cable.

It will be stated here that, while I have described the parts as being connected by means of cables, it is to be understood, that any suitable connection means, such as jointed rods, tapes, ropes, chains or flexible metal bands could be used without departing from the spirit of the invention. This is likewise true of the other parts and for this reason I have illustrated several modifications of constructions which will now be described.

In Figure 7, the cables 32—32' are extended along the outer side of the frame members 1 and 2 over guide rollers 50—51 which draw the cables in from the brake levers close to the frame, and over supporting rollers 52—53 located in spaced relation between the guide rollers. Extended transversely of the frame is a shaft 54 and fitted revolubly on its opposite ends are sleeves 55—55' provided at their outer ends with lever arms 56—56' having rollers at their ends engageable with the cables. At the inner ends of the sleeves are upwardly and forwardly inclined arms 57—57' provided with eyes 58 at their ends wherein the opposite ends of an equalizing bar 59 are extended. Connected centrally to the bar is a cable 60 that extends rearwardly and about pulley 61, that is supported from the cross member 6, and which is then extended forwardly and connected with foot pedal 41. With this construction a downward movement of the foot pedal draws, through cable 60, the equalizing bar 59 rearwardly, thereby rotating sleeves 55—55' and causing levers 56—56' to deflect the cables 32—32' downwardly between the supporting rollers 52—53 and thereby actuating both forward and rearward brakes. Equalization of the braking forces is effected through the cables and through the compensating action of bar 59.

In Figure 8 is illustrated another alternative construction similar in some ways to that shown in Figure 7 but, wherein the cables 32—32' are extended over the rollers 52 and under the rollers 53, and wherein the sleeves 55—55' are provided at their outer ends with oppositely extending lever arms 63—63' with rollers at their ends engaging upper and lower sides of the cables, and at their inner ends have levers 64—64' to which the ends of a cable 65 are connected. The foot pedal 41 is fixed to a sleeve 66 that is rotatable on cross rod 40 and extended from the sleeve is an arm 67 provided with a pulley 68 over which cable 65 extends. When the foot pedal is depressed, braking tension is transmitted to the cables 32—32' through the medium of cable 65, sleeves 55—55' and levers 63—63', and the forces are equalized by the automatic adjustment of cable 65 about pulley 68.

In this last construction I have included an emergency brake lever 70 connected by means of cable 71 with an arm 72 extending from a sleeve 73. This sleeve, rotatable on the shaft 74, which also supports the sleeves 55—55', has at its ends interlocking connections with the said sleeves. Movement of this lever actuates the brakes through rotation of sleeves 55—55' in the manner as before described. An advantage gained by the use of the double levers 63—63' over the single lever type 56 is the increase of leverage.

Figure 6:
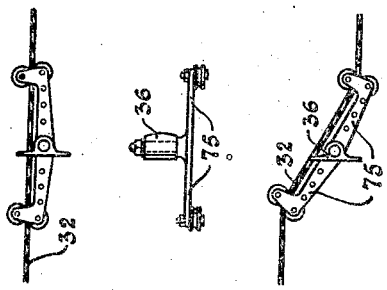
Figure 6 is a group of views of an alternative type of cable tightener for use in connection with systems shown in Figure 1, showing it in normal position, inside elevation and tightening position.

The double lever type 75, as illustrated in Figure 6, which swings horizontally, or the types illustrated in Figures 9 and 10, which swing vertically, could likewise be used in the system illustrated in Figure 1 with but little alteration; the type of levers used depending on the chassis construction or other requirements.

In most instances it is desirable, in order to prevent front wheel skidding, especially when making turns, that the brakes of the rear wheels act slightly in advance of the front wheel brakes. Such primary action of the rear brakes is accomplished in the systems using the single arm tightening levers 37, or 56, by locating the levers 37 or 56 at such positions relative to the guide rollers 34 and 35 that they come into contact with the cables closer to the rear brake connections than the front brake connections. In the present constructions this is accomplished by locating the pivot points 36 of these levers approximately halfway between the axles of the front and rear wheels and then extending these levers rearwardly from their supporting points. In systems using the double arm 63, or 75, by making the rearwardly extending arm longer than the forwardly extending one. Such arrangements only cause primary contacting of the rear brake shoes with their drums, and after such contact, the braking forces on all wheels are equalized.

By so constructing, I have provided a brake system, in which the brake mechanism of the trailing or driving wheels and the front or steering wheels are interconnected in such manner, that an operation of a control tightens the flexible connections, thereby bringing the brake mechanism of the rear wheels into action, which, in turn, reacts upon the brake mechanism of the other wheels through the functioning of the flexible connections, which distribute the forces equally to the brake mechanisms of the other wheels.

Having thus described my invention, what I claim as new therein and desire to secure by Letters Patent is:

1. In a vehicle having forward and rearward wheels with individual brakes for said wheels and actuating levers for said brakes, flexible means directly connecting the levers of wheels at the same side of the vehicle and extending substantially in a straight line between them and means operable to deflect the connections to cause tension thereon, whereby said levers are moved to actuate the brakes.

2. In a vehicle of the character disclosed having forward and rearward wheels equipped with braking means and levers for actuating said braking means, cables directly connecting the brake actuating levers of wheels at the same side of the vehicle, individual means movable into engagement with the cables to cause tension to be transmitted therethrough to the brake actuating levers, and control means for moving the cable engaging means.

3. In a vehicle of the character described having forward and rearward wheels equipped with braking means, a common means for actuating all brakes through which is effected a primary functioning of the rear wheel brakes and an equal distribution of forces to all brakes thereafter.

4. In a vehicle of the character disclosed having its wheels equipped with braking means and levers for actuating said braking means, cables directly connecting the brake actuating levers of corresponding forward and rearward wheels, means movable into engagement with the cables to cause tension to be transmitted therethrough to the brake actuating levers and whereby primary functioning of the rear wheel brakes is effected.

5. In a vehicle of the character described having its wheels equipped with braking means and levers movable to actuate said braking means, cables directly connecting the brake actuating levers of corresponding forward and rearward wheels, rotatably mounted levers movable into engagement with the cables to effect functioning of the brakes, a connection between the last named levers and a control having a compensating connection with the connecting means of the rotatably mounted levers.

6. In a vehicle of the character disclosed comprising forward and rearward wheels equipped with braking means and swingingly movable levers for actuating the brakes, cable guiding and supporting means, cables directly connecting the actuating levers of corresponding forward and rearward wheels and extending over said guiding and supporting means, a pair of rotatably supported levers engageable with the cables to effect actuation of the brakes, a cable connecting said levers, a pulley mounted movably on said cable, and a control lever connected with the pulley.

7. In a vehicle of the character described comprising forward and rearward wheels equipped with brakes and swingingly movable levers for actuating the brakes, cable guiding and supporting means, cables connecting the levers of corresponding forward and rearward wheels and drawn taut over said guiding and supporting means, pivotally supported levers with cable engaging means thereon, a cable connected at its ends with the last named levers and drawn taut, a compensating device on said cable and controls connected with the compensating device through which braking forces may be distributed equally to the brake connecting cables.

Signed at Seattle, Wash., this 17 day of April, 1923.

GEORGE D. HUGO.